United States Patent
Awada et al.

(10) Patent No.: US 12,089,065 B2
(45) Date of Patent: Sep. 10, 2024

(54) ENHANCED BEAM MANAGEMENT FOR HIGH SPEED NETWORKS

(71) Applicant: Nokia Technologies Oy, Espoo (FI)

(72) Inventors: Ahmad Awada, Munich (DE); Mikko Saily, Laukkoski (FI); Ingo Viering, Munich (DE); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 322 days.

(21) Appl. No.: 17/770,586

(22) PCT Filed: Oct. 21, 2019

(86) PCT No.: PCT/EP2019/078501
§ 371 (c)(1),
(2) Date: Apr. 20, 2022

(87) PCT Pub. No.: WO2021/078351
PCT Pub. Date: Apr. 29, 2021

(65) Prior Publication Data
US 2022/0408275 A1    Dec. 22, 2022

(51) Int. Cl.
*H04W 16/28* (2009.01)
*H04W 16/26* (2009.01)

(52) U.S. Cl.
CPC .......... *H04W 16/28* (2013.01); *H04W 16/26* (2013.01)

(58) Field of Classification Search
CPC ... H04W 16/28; H04W 16/26; H04W 56/001; H04W 40/22; H04W 88/04; H04W 56/0015
See application file for complete search history.

(56) References Cited

U.S. PATENT DOCUMENTS 10,230,448 B2 * 3/2019 Calcev ............... H04B 7/155
2015/0131618 A1    5/2015 Chen

FOREIGN PATENT DOCUMENTS

WO    2012136254 A1    10/2012
WO    2021078351 A1    4/2021

OTHER PUBLICATIONS

"Beam management reference signals for IAB MT"; 3GPP TSG RANG WG1 Meeting #97; R1-1906003; Source: Huawei, HiSilicon; Reno, USA, May 13-17, 2019; 1 pg.
"Discussions on NR IAB support"; 3GPP TSG RAN WG1 Meetng #93; R1-1806649; Source: LG Electronics; Busan, Korea; May 21-25, 2018; 12 pgs.

* cited by examiner

*Primary Examiner* — Keith Ferguson
(74) *Attorney, Agent, or Firm* — Lippes Mathias LLP

(57) ABSTRACT

For example, a communication link between a first relay node and a second relay node, which are in synchronous movement, is established. Beam management assistance information from the first relay node is received at the second relay node upon an occurrence of beam failure at the first relay node (S801). At the second relay node it is decided about a timing at which the received beam management assistance information is to be transmitted to a serving network node (S802), and the received beam management assistance information is transmitted from the second relay node to the serving network node at the decided timing (S803).

20 Claims, 11 Drawing Sheets

ENHANCED BEAM MANAGEMENT FOR HIGH SPEED NETWORKS

CROSS-REFERENCE TO RELATED APPLICATION

This application is the National Stage of, and therefore claims the benefit of, International Application No. PCT/EP2019/078501 filed on Oct. 21, 2019, entitled "ENHANCED BEAM MANAGEMENT FOR HIGH SPEED NETWORKS," which was published in English under International Publication Number WO 2021/078351 on Apr. 29, 2021. The above application is commonly assigned with this National Stage application and incorporated herein by reference in its entirety.

TECHNICAL FIELD

At least some example embodiments relate to an apparatus and method relating to a network node and/or a plurality of relay nodes, which are synchronously moving. More specifically, at least some example embodiments relate to High Speed Train (HST)/high speed mobility and/or synchronous mobility where a group of user equipments (UEs) have the same moving path. Mobility of HST represents one of the key verticals in 3GPP.

The high-speed train scenario is seen important for both Long Term Evolution (LTE) and New Radio (NR).

LIST OF ABBREVIATIONS/ACRONYMS

3GPP 3$^{rd}$ Generation Partnership Project
BFI Beam Failure Instance
BFD Beam Failure Detection
BFR Beam Failure Recovery
BLER Block Error Rate
BS Base Station
BWP Bandwidth Parts
CSI-RS Channel State Information-Reference Signal
DL Downlink
eNB Evolved NodeB
gNB Next Generation NodeB
HST High Speed Train
IAB Integrated Access and Backhaul
LTE Long Term Evolution
NR New Radio
PBCH Physical Broadcast Channel
PDCCH Physical Downlink Control Channel
PCell Primary Cell
RLF Radio Link Failure
RN Relay node
RRC Radio Resource Control
RLM Radio Link Monitoring
RRM Radio Resource Management
SS Synchronization Signal
SSB Synchronization Signal Block
TS Technical Specification
UE User Equipment

BACKGROUND

In high speed and/or synchronous mobility scenarios, which can be exemplified by a train/vehicle that can consist of multiple carriages where on each/some of the carriages a moving Integrated Access and Backhaul (IAB) node (in the following also referred to as a relay node) is installed, the IAB node behaves like a base station, or evolved NodeB (eNB) or the like with respect to the UEs inside each carriage which are served on the access link. On the other hand, the IAB node behaves like a UE with respect to an IAB donor (in the following also referred to as a serving network node) providing the backhaul link. The IAB donor could be a base station installed in a fixed location/site and applies a beamformed transmission, i.e., the IAB donor can provide several beams.

A typical scenario of this is illustrated in FIG. 1. In FIG. 1, the IAB donor can provide four beams. In addition, (at least) a logical interface is assumed between the IAB nodes, e.g., using a wired onboard communication or a wireless radio connection. The IAB nodes could also be thought of as moving relays.

As the train moves, the backhaul link of each IAB node has to be handed over to a new IAB donor which can be performed by executing inter-cell handover. Moreover, in an NR beamformed system, the serving beam of the backhaul link has to be switched to another and/or better one from the same IAB donor. This can be done by performing beam switching which is part of a beam management procedure in NR.

Note that inter-cell handover requires coordination between two IAB donors whereas a beam switching decision to a better serving beam is taken solely by a serving IAB donor.

Beam Management Procedure:
The beam failure detection procedure is described in TS 38.300 [Section 9.2.8] as follows:

"For beam failure detection, the gNB configures the UE with beam failure detection reference signals (SSB or CSI-RS) and the UE declares beam failure when the number of beam failure instance indications from the physical layer reaches a configured threshold before a configured timer expires."

"SSB-based Beam Failure Detection is based on the SSB associated to the initial DL BWP and can only be configured for the initial DL BWPs and for DL BWPs containing the SSB associated to the initial DL BWP. For other DL BWPs, Beam Failure Detection can only be performed based on CSI-RS".

An example of beam failure detection is provided in FIG. 2. As it can be seen in FIG. 2, a counter of beam failure instance (BFI) indications is incremented each time a new indication is received. Furthermore, the counter is reset if no BFI is received within a time duration controlled by a timer which is re-started with the reception of each BFI. Beam failure detection is declared if the counter for BFI reaches a pre-configured threshold, e.g., equal to three in the example shown in FIG. 2.

A beam failure recovery procedure is described in TS 38.300 as follows:
"After beam failure is detected, the UE:
triggers beam failure recovery by initiating a Random Access procedure on the primary cell (PCell);
selects a suitable beam to perform beam failure recovery (if the gNB has provided dedicated Random Access resources for certain beams, those will be prioritized by the UE).
Upon completion of the Random Access procedure, beam failure recovery is considered complete."

If the beam failure recovery fails, i.e., if random access fails, the UE declares Radio Link Failure (RLF).

Radio Link Monitoring (RLM)
The UE performs RLM as described in the following:
A UE can be configured with a set of resources indices RLM-RS-List for RLM.

This list can be either a SS/PBCH block resource list (RLM-SSB) or a CSI-RS resource list (RLM-CSIRS).

Out-of-sync is indicated to Radio Resource Control (RRC) layer when the radio link quality is worse than the threshold Qout for all resources in RLM-RS-List.

In-sync is indicated to the RRC layer when the radio link quality is better than Qin for any resource in RLM-RS-List.

The threshold Qout is defined as the level at which the radio link quality cannot be reliably received. The threshold Qout can correspond to 10% block error rate (BLER) of a hypothetical physical downlink control channel (PDCCH) transmission, for example. On the other hand, the threshold Qin is defined as the level at which the radio link quality can be received reliably. The threshold Qin can correspond to 2% BLER of a hypothetical PDCCH transmission, for example.

An example of RLM and RLF detection is shown in FIG. 3, which shows an exemplary radio link quality over time to illustrate RLM and RLF detection as well as the respective thresholds Qin and Qout for declaring RLF. The UE detects RLF based on DL radio link quality when the radio link quality is below Qout and the timer T310 expires. The timer T310 is started when N310 out-of-sync indications are reported and is stopped when N311 in-sync indications are received.

However, in the scenario shown in FIG. 1, if the first IAB node (N1) detects a beam failure on the backhaul link it is likely that the following IAB nodes (2, 3 etc.) (N2, N3) will also detect a beam failure at later time instants. This is because all IABs nodes move synchronously on the same path/track and with a high speed.

As detailed above, upon detecting beam failure, the IAB node will trigger beam failure recovery. If beam failure recovery fails as well, the IAB node declares RLF and performs RRC re-establishment to recover the radio link. The mobility/service interruption can start already while the UE is detecting beam failure (e.g., upon receiving a first beam failure instance) and may last for some time if the recovery is performed by means of beam failure recovery or RRC re-establishment.

Furthermore, the IAB donor is not aware of the beam failure and would continuously try to send data and control packets to the UE which causes unnecessary signalling.

The problem that at least some example embodiments aim to solve is how to reduce or avoid mobility interruption of IAB nodes caused by beam failure detection/recovery or RRC re-establishment in a scenario where the IABs nodes are moving synchronously on a high speed train and how to reduce unnecessary radio transmissions as a result.

It is to be noted that in current 3GPP specifications, the IAB nodes are assumed to be stationary. Moreover, if an IAB node detects a beam failure, it will try to recover the radio link either by beam failure recovery or RRC re-establishment which causes mobility interruption and unnecessary radio transmissions from the IAB donor as described above.

As such, the prior-art solutions do not devise enhancing solutions for beam management in high speed and/or synchronous mobility scenario as that shown in FIG. 1, where an interface between IAB nodes might be available.

SUMMARY

It is an object of at least some of example embodiments to improve the prior art.

This object is achieved by the methods, apparatuses and non-transitory storage media as specified in the appended claims.

Further, computer program products, comprising computer executable code, which, when executed by a processor, perform the method according to any of the method aspects are provided.

According to at least some example embodiments, at least one of the following advantages are achieved:

IAB nodes avoid beam failures, which leads to better mobility performance and reduced outage.

Better usage of radio resources as an IAB donor stops the transmission to the IAB node that detected the beam failure earlier.

The network does not need to be aware that the IAB nodes are moving synchronously or know the speed of the train or its direction, which eases the implementation.

Further advantages become apparent from the following detailed description.

BRIEF DESCRIPTION OF THE DRAWINGS

Further details, features, objects, and advantages are apparent from the following detailed description of example embodiments of at least some aspects, which is to be taken in conjunction with the appended drawings, wherein.

DETAILED DESCRIPTION OF CERTAIN EXAMPLE EMBODIMENTS

Herein below, certain aspects are exemplified by at least some embodiments, which are described in detail with reference to the accompanying drawings. Features of the example embodiments can be freely combined with each other unless otherwise described. However, it is to be expressly understood that the description of certain example embodiments/aspects is given by way of an example only, and that it is not intended to be understood as limiting the application to the details disclosed.

It is to be understood that any of the modifications mentioned can be applied singly or in combination to the respective aspects to which they refer, unless they are explicitly stated as exclusive alternatives.

Moreover, it is to be understood that the apparatus is configured to perform the corresponding method, although in some cases only the apparatus or only the method is described.

References to standards whether existing or under development, serve as a mere example and are not to be understood as limiting the concept(s) suggested according to one or more aspects of the at least example embodiments.

According to at least some example embodiments, a communication link is established between a first IAB node (N1) (also referred to as "a first one of a plurality of relay nodes") and at least a second IAB node (N2) (also referred to as "a second one of the plurality of relay nodes", wherein the first and the second IAB nodes (N1, N2) are in synchronous movement. The at least second one (N2) of the plurality of relay nodes receives beam management assistance information from the at first one (N1) of the plurality of relay nodes upon an occurrence of beam failure at the first one (N1) of the plurality of relay nodes. Then the at least second one (N2) of the plurality of relay nodes decides about a timing at which the received beam management assistance information is to be transmitted to an IAB donor (D) (also referred to as "a serving network node").

Afterwards, the at least second one (N2) of the plurality of relay nodes transmits the received beam management assistance information to the serving network node (D) at the decided timing.

Figure 4:
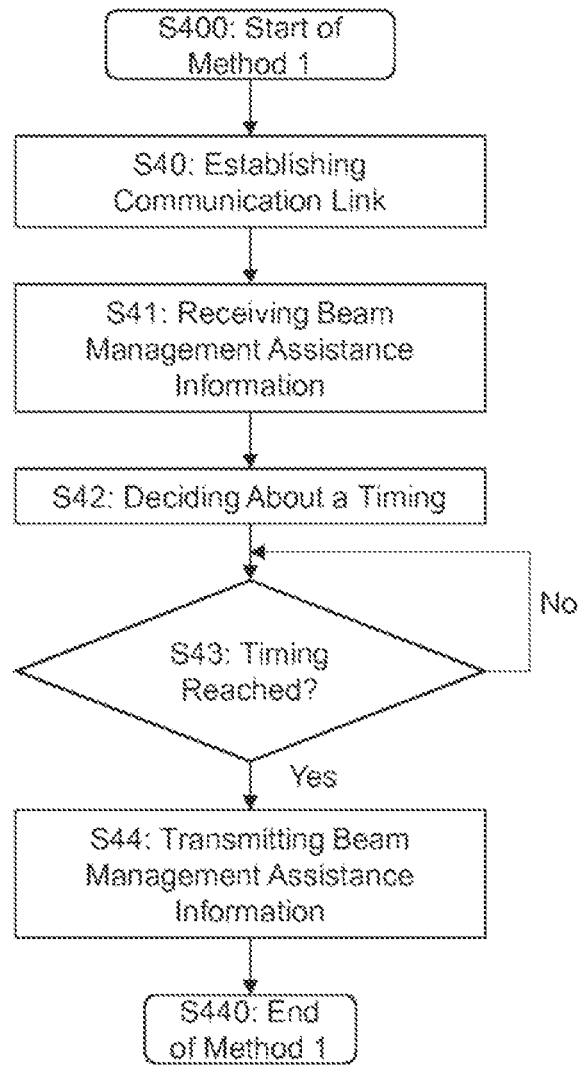
FIG. 4 shows a flowchart illustrating an example method according to at least some embodiments.

In FIG. 4 a method 1 according to at least some example embodiments is illustrated.

In the following methods the first one of a plurality of relay nodes is an IAB node moving in front of a second one of the plurality of relay nodes and the second one of the plurality of relay nodes is a subsequent IAB node.

Method 1 starts in S400. Then, in S40 of method 1, a communication link between a first one of a plurality of relay nodes and at least a second one of the plurality of relay nodes is established. The first and the second one of the plurality of relay nodes are synchronously moving. Subsequently, in S41, the at least second one of the plurality of relay nodes receives beam management assistance information from the first one of the plurality of relay nodes upon an occurrence of beam failure at the first one of the plurality of relay nodes. Then, in S42, the at least second one of the plurality of relay nodes decides about a timing at which the received beam management assistance information is to be transmitted to a serving network node. If in S43 the decided timing for transmission of the received beam management is reached (S43: yes), the at least second one of the plurality of relay nodes transmits the beam management assistance information to the serving network node (S44). Otherwise, the at least second one of the plurality of relay nodes waits until the timing is reached (S43: no). Then, after transmission of the beam management assistance information to the serving network cell (S44), the method 1 ends (S440).

In S41, the beam management assistance information may contain at least one of the following information:
(1) A set X of serving resource indices (e.g. SSB/CSI-RS) for which the beam failure was detected.
(2) A set Y of potential resource indices (e.g. SSB/CSI-RS) candidates that can be used for beam failure recovery.
(3) The timestamp at which beam failure was detected. The timestamp may be expressed as well in terms of radio frame/subframe/slot number.
(4) The identification (ID) of the serving network node (current serving IAB donor).

Furthermore, in S42, the at least second one of the plurality of relay nodes decides on the time instant when the beam management assistance information received from the first one of the plurality of relay nodes is to be sent to the serving network node.

In at least one example embodiment, the at least second one of the plurality of relay nodes may decide to send the beam management assistance information immediately.

Moreover in at least some example embodiments, the serving network node (which is also the serving base station (BS) for the at least second one of the plurality of relay nodes) can consider the beam management assistance information when the at least second one of the plurality of relay nodes is served on the same set of resource indices (e.g. SSB/CSI-RS) for which the first one of the plurality of relay nodes (the relay node moving in front of the at least second one of the plurality of relay nodes) has declared beam failure.

In addition, in at least some other example embodiments, the at least second one of the plurality of relay nodes may decide to send the information at the instant when the serving network node should take actions to prevent any possible beam failure in the at least second one of the plurality of relay nodes.

In at least some example embodiments, the decision on the time instant considers the distance d separating the two relay nodes (first one and second one of the plurality of relay nodes), the speed v of the vehicle carrying the relay nodes and the delay Tr over the interface connecting the two relay nodes.

For instance, the beam management assistance information can be sent by the at least second one of the plurality of relay nodes slightly before a time instant T. The time instant T may be calculated in at least some example embodiments as T=time instant of receiving the beam management assistance information from the first one of the plurality of relay nodes+offset [ms]. The offset may be equal to (d/v−Tr) and accounts for the time needed to cover the distance separating two relay nodes of the plurality of relay nodes.

In general, if the beam failure report has been propagated to relay node N which is following the at least second one of the plurality of relay nodes by N−1 hops, then relay node N can send the beam management assistance information to the serving network node slightly before the time instant T, wherein the time instant T is calculated by T=time instant of receiving the beam management assistance information+offset accounting for the time to cover the distance separating the first one of the plurality of relay nodes and relay node N, wherein the offset is (N−1) times the offset of two neighboring relay nodes.

In at least some other example embodiments, the relay node, for example, the at least second one of the plurality of relay nodes may send the beam management assistance information to the network node when the at least second one of the plurality of relay nodes gets configured with same set of resource indices (SSB/CSI-RS) for which the first one of the plurality of relay nodes has declared beam failure.

In S44 the at least second one of the plurality of relay nodes sends the beam management assistance information received from the first one of the plurality of relay nodes. The beam management assistance information includes in at least some example embodiments an indication about the possibility of declaring beam failure on the current set of serving resource indices (e.g., SSB/CSI-RS) and the potential candidates of new serving resource indices (e.g., SSB/CSI-RS).

Furthermore, in at least some example embodiments, the set of potential candidates of new serving resource indices (e.g., SSB/CSI-RS) can be the same as the set Y received from the first one of the plurality of relay nodes.

In at least some example embodiments, S41 further comprises receiving a beam failure report from the first one of the plurality of relay nodes. Furthermore, in some example embodiments S44 may further comprise transmitting an indication about beam failure detection by the first one of the plurality of relay nodes to the serving network node.

Moreover, in at least some example embodiments the beam failure report comprises at least one of identification information about the first one of the plurality of relay nodes, at which the beam failure occurred.

In at least some example embodiments the transmission of the indication about beam failure detection may be performed in combination with S44 at the decided timing or may be performed independently thereof.

Figure 5:
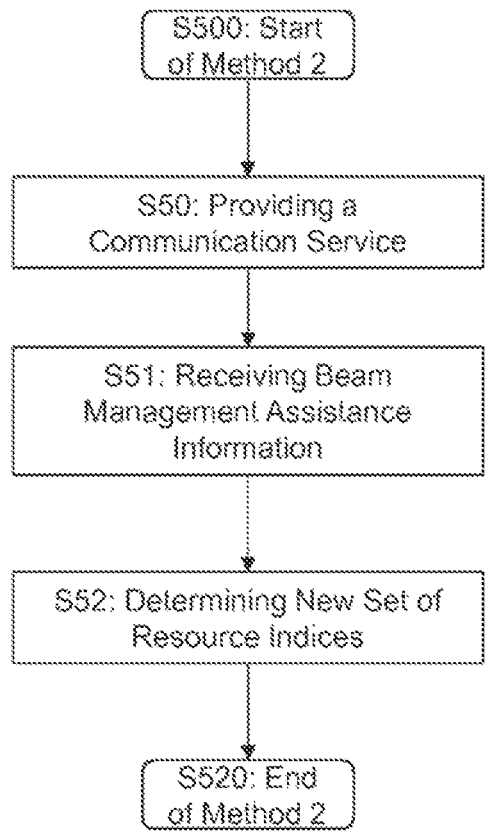
FIG. 5 shows a flowchart illustrating an example method according to at least some embodiments.

In FIG. 5 a method 2 according to at least some example embodiments is illustrated.

Method 2 starts in S500. Then, in S50 of method 2, a serving network cell provides a communication service to a first one of a plurality of relay nodes, wherein the plurality of relay nodes is synchronously moving. Then in S51 the serving network node receives beam management assistance information from a second one of the plurality of relay nodes and determines subsequently in S52 a new set of serving resource indices (e.g., SSB/CSI-RS). In S520 the method 2 ends.

In S52 the serving network node also changes the set of serving resource indices (e.g., SSB/CSI-RS).

In at least some example embodiments, the new set of serving resource indices (e.g., SSB/CSI-RS) includes at least resource indices (e.g., SSB/CSI-RS) from the set Y.

In at least some other example embodiments, the new set of serving resource indices (e.g., SSB/CSI-RS) consists of the current set of resource indices (e.g., SSB/CSI-RS) and at least resource indices (e.g., SSB/CSI-RS) from set Y, i.e., the current set of serving resource indices (e.g. SSB/CSI-RS) is extended.

Figure 6:
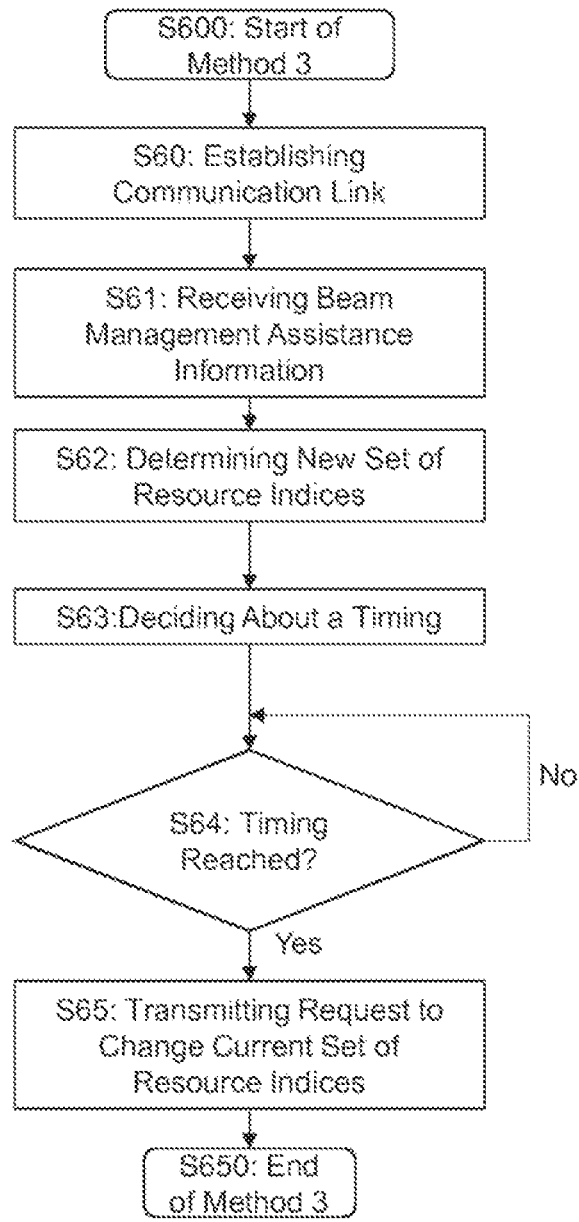
FIG. 6 shows a flowchart illustrating an example method according to at least some embodiments.

In FIG. 6, a method 3 according to at least some example embodiments is illustrated.

Method 3 starts in S600. The steps S60 to S61 of FIG. 6 are substantially the same as steps S40 to S41 of FIG. 4 and therefore a detailed description of these steps is omitted. In S62 the at least second one of the plurality of relay nodes determines a new set of resource indices (e.g., SSB/CSI-RS). Then, in S63 the at least second one of the plurality of relay nodes decides about a timing at which a request to change a current set of resource indices to the determined new set of resource indices (e.g., SSB/CSI-RS) is to be transmitted to a serving network node. If in S64 the decided timing for transmission of a request to change the current set of resource indices is reached (S64: yes), the at least second one of the plurality of relay nodes transmits the request to the serving network node (S65) to change the current set of resource indices to the determined new set of resource indices (determined in S62). Otherwise, the at least second one of the plurality of relay nodes waits for the transmission of the request (S64: no). Then, after transmitting the request to change the current set of resource indices to the determined new set of resource indices to the serving network node (S65), the method 3 ends (S650).

In at least one example embodiment, the determined new set of resource indices (e.g., SSB/CSI-RS) includes at least resource indices (e.g., SSB/CSI-RS) from the set Y.

In at least some other example embodiments, the determined new set of resource indices (e.g., SSB/CSI-RS) consists of the current set of resource indices (e.g., SSB/CS-RS) and at least resource indices (e.g., SSB/SCI-RS) from the set Y. i.e., the current set of resource indices (e.g., SSB/CSI-RS) is extended.

In S65, the at least second one of the plurality of relay nodes sends a request to a serving network node to change the set of serving resource indices (e.g., SSB/CSI-RS). The request includes the new set of serving resource indices (e.g., SSB/CSI-RS) as determined in S62.

Figure 7:
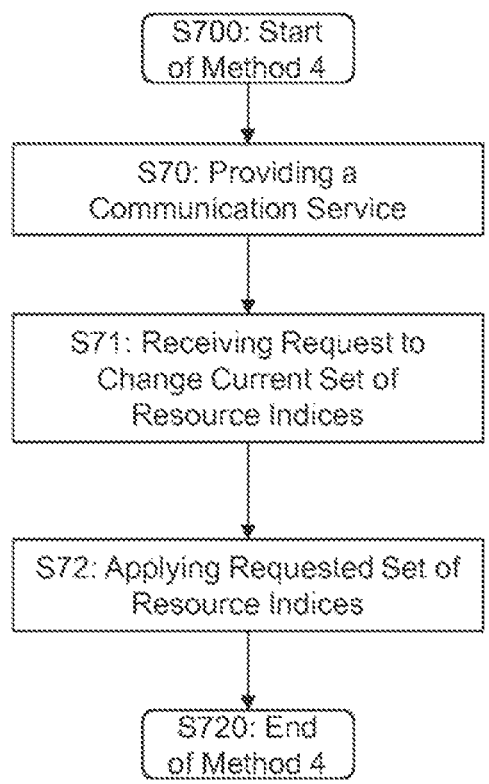
FIG. 7 shows a flowchart illustrating an example method according to at least some embodiments.

In FIG. 7 a method 4 according to at least some example embodiments is illustrated.

Method 4 starts in S700. Step S70 of FIG. 7 is substantially the same as step S50 of FIG. 5 and therefore a detailed description is omitted. In S71 the serving network node receives a request to change a current set of serving resource indices (e.g., SSB/CSI-RS) to a new set of resource indices, determined by a second one of the plurality of relay nodes. Subsequently, in S72, the serving network node may apply the new set of resource indices. In S720 the method 4 ends.

Figure 8:
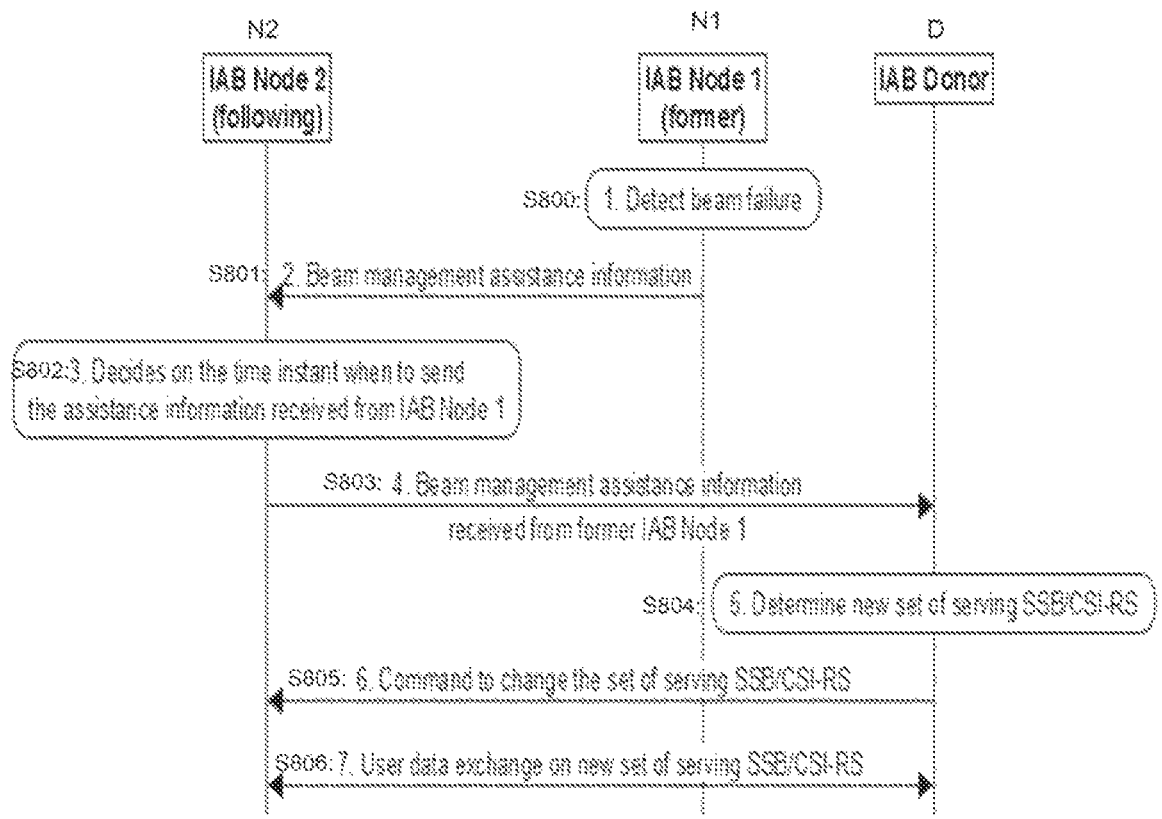
FIG. 8 shows a signaling diagram illustrating steps of transmission of beam management assistance information from an IAB node to an IAB donor according to at least some example embodiments.

FIG. 8 shows a signaling diagram illustrating steps of transmission of beam management assistance information from an IAB node to an IAB donor according to at least some example embodiments. Entities involved in the signaling are illustrated in a horizontal arrangement, such as an IAB node 2 (N2), an IAB node 1 (N1) and an IAB donor (D). Messages exchanged between such entities are illustrated as arrows and actions/processing of messages at an entity are illustrated as boxes/circles. The time sequence of the messages is from "top-to-bottom" in the diagram.

In step S800 an IAB node 1 (N1) detects beam failure on the backhaul link. Then in step S801 so called "beam management assistance information" (e.g., the set of failed serving resource indices (e.g., SSB/CSI-RS), along with the set of SSB/CSI-RS for recovery if it exists) is transmitted to a following IAB node 2 (N2) and received at IAB node 2 (N2). In step S802 IAB node 2 (N2) decides on the time instant when the beam management assistance information, received from IAB node 1 (N1), is to be sent to an IAB donor (D). Then in step S803 IAB node 2 (N2) sends the received beam management assistance information to the IAB donor (D) at the time instant, which was decided in step S802. After receiving beam management assistance information about IAB node 1 (N1) from IAB node 2 (N2), the IAB donor (D) determines a new set of serving SSB/CSI-RS in step S804. Then, after determining the new set of SSB/CSI-RS in step S804, the IAB donor (D) transmits a command to change the set of serving SSB/CSI-RS to IAB node 2 (N2) in step S805. Lastly, in step S806 user data is exchanged between the IAB node 2 (N2) and the IAB donor (D), while using the new set of serving SSB/CSI-RS.

It can be understood that the steps of FIGS. 4 and 5 are also reflected in the example procedure of FIG. 8. Receiving beam management assistance information in step S41 corresponds to step S801. In step S42 a timing at which the beam management assistance information should be sent to the serving network nodes is determined, which corresponds to step S802 of FIG. 8. Transmission/receiving of beam management assistance information to/at a current network node is performed in steps S803 and S44/S51. The determination of a new set of resource indices of FIG. 5 step S52 corresponds to step S804 of FIG. 8.

Figure 9:
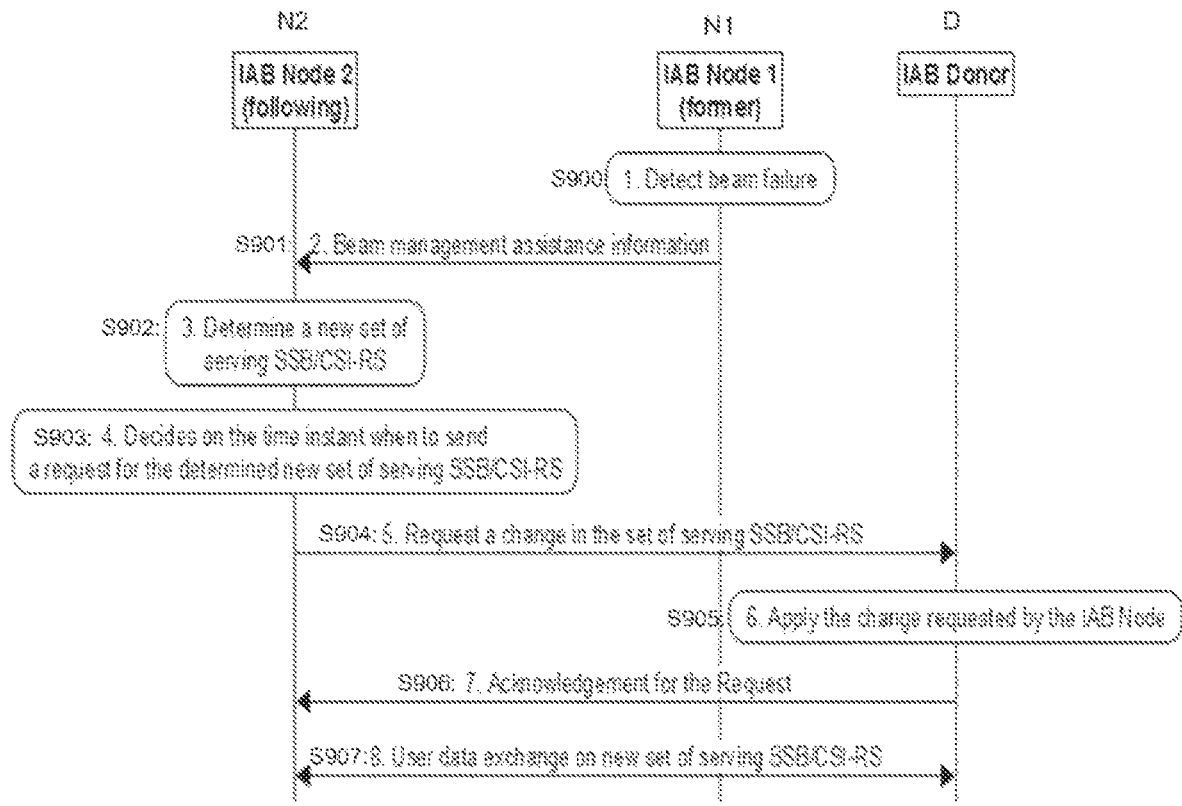
FIG. 9 shows a signaling diagram illustrating steps of requesting a configuration change in the set of serving resource indices (e.g., SSB/CSI-RS) from an IAB node to an IAB donor according to at least some example embodiments.

FIG. 9 shows a signaling diagram illustrating steps of requesting a configuration change in the set of serving resource indices from an IAB node to an IAB donor according to at least some example embodiments. Entities involved in the signaling are illustrated in horizontal arrangement, such as an IAB node 2 (N2), an IAB node 1 (N1) and an IAB donor (D). Messages exchanged between such entities are illustrated as arrows and actions/processing of messages at an entity are illustrated as boxes/circles. The time sequence of the messages is from "top-to-bottom" in the diagram.

Steps S900 to S901 are substantially the same as steps S800 to S801 and a detailed description thereof will therefore be omitted. In step S902 IAB node 2 (N2) determines a new set of SSB/CSI-RS. Step S903 is basically the same as step S802, except that here the decided timing denotes the time instant for transmitting a request to change the current set of resource indices to a new set of resource indices, which were determined in S902. However, the calculation of the time instant itself remains the same. Subsequently, in step S904, a request to change the serving/current set of SSB/CSI-RS to the newly determined set of SSB/CSI-RS is transmitted from IAB node 2 (N2) to an IAB donor (D). In step S905 the requested change is applied by the IAB donor (D) and an acknowledgement for the request is sent back to IAB node 2 (N2) (S906). Lastly, in step S907 user data is exchanged between the IAB node 2 (N2) and the IAB donor (D), while using the new set of serving SSB/CSI-RS.

It can be understood that the steps of FIGS. 6 and 7 are also reflected in the example procedure of FIG. 9. Receiving beam management assistance information in step S61 corresponds to step S901. Determining a new set of resource indices in S62 of FIG. 6 corresponds to S902 of FIG. 9. In step S63 a timing at which the determined new set of resource indices should be sent to the serving network nodes is determined, which corresponds to step S903 of FIG. 9. Transmitting/receiving a request to change the current set of resource indices in S65 of FIG. 6/S71 of FIG. 7 corresponds to S904 of FIG. 9. Applying the requested set of resource indices at the serving network node is performed in steps S72/S905.

Figure 10:
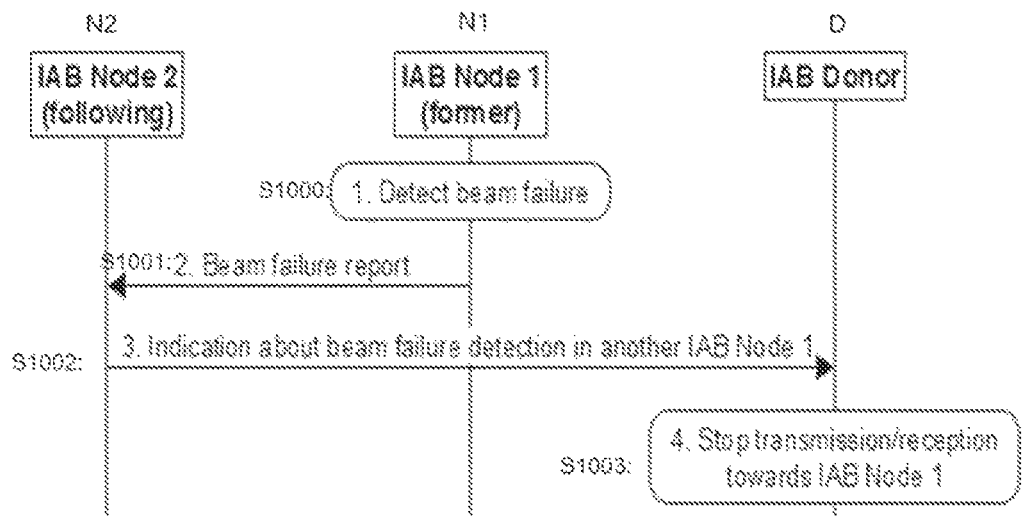
FIG. 10 shows a signaling diagram illustrating steps of transmission of an indication about beam failure detection in another IAB node to the IAB donor according to at least some example embodiments.

FIG. 10 shows a signaling diagram illustrating steps of transmission of an indication about Beam Failure Detection (BFD) in another IAB node to the IAB donor according to at least some example embodiments. As for FIG. 10 entities involved in signaling are illustrated in horizontal arrangement, such as an IAB node 2 (N2), an IAB node 1 (N1) and an IAB donor (D). Messages exchanged between such entities are illustrated as arrows and actions/processing of messages at an entity are illustrated as boxes/circles. The time sequence of the messages is from "top-to-bottom" in the diagram.

In S1000 an IAB node 1 (N1) detects a beam failure. Then in S1001 IAB node 1 (N1) transmits a beam failure report to the following IAB node 2 (N2). Subsequently, in S1002 IAB node 2 (N2) transmits an indication about BFD in IAB node 1 (N1) to an IAB donor (D). Upon receiving such an indication, the IAB donor (D) stops transmission/reception towards IAB node 1 (N1) (S1003).

In at least some example embodiments, the beam failure report in S1001 should contain at least the ID of the IAB node that detected beam failure (IAB node 1) and may additionally comprise some other information from the beam management assistance information of FIGS. 4 to 9.

In at least some example embodiments in S1002, the indication includes at least an ID for IAB node 1, e.g., C-RNTI, that is received in the beam failure report in S1001. By using this ID, the IAB donor may stop the transmission/reception towards IAB node 1 in at least some example embodiments.

In at least some example embodiments, the signaling in S1002 can be combined with S803 of FIG. 8 or S904 of FIG. 9 or it can be performed independently.

Figure 11:
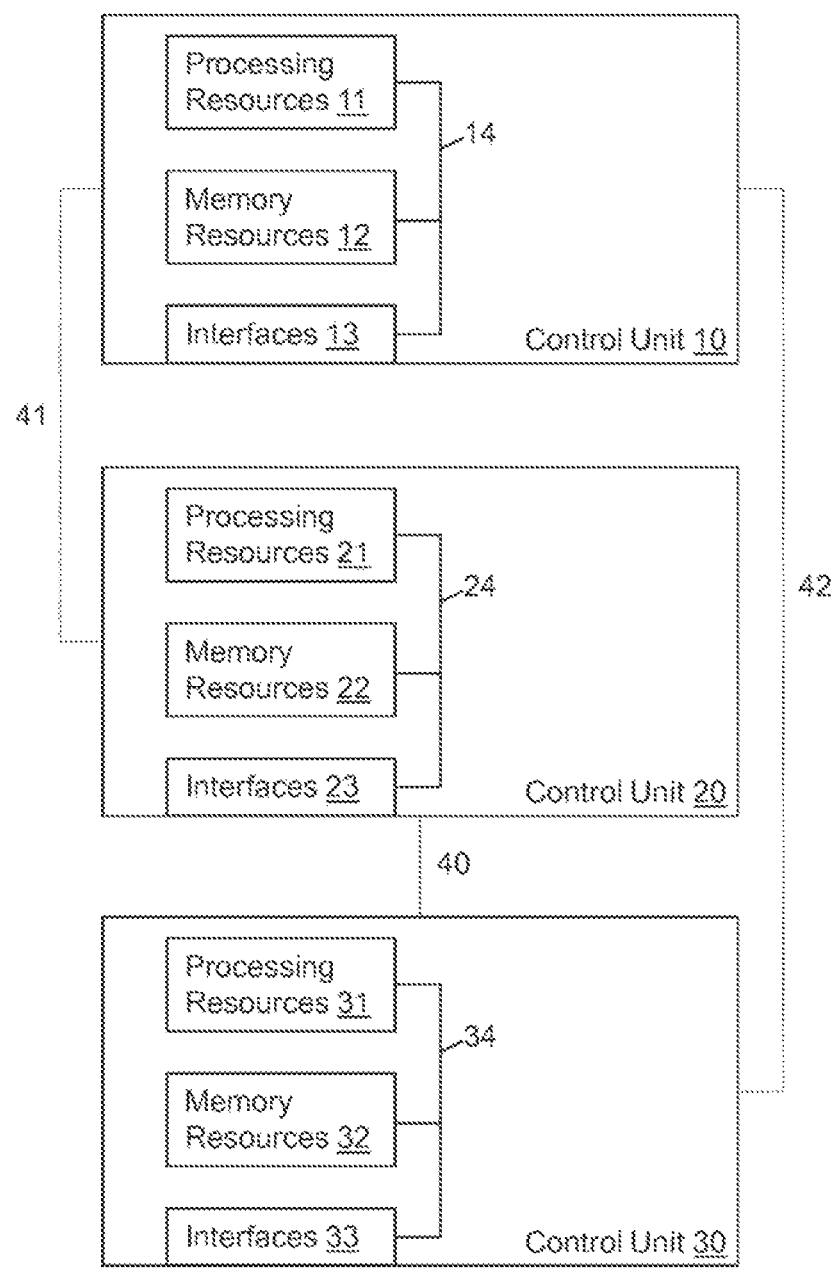
FIG. 11 shows a schematic block diagram illustrating a configuration of control units in which at least some example embodiments are implementable.

FIG. 11 depicts control units 10, 20, and 30, each comprising processing resources (e.g., processing circuitry) 11, 21, 31, memory resources (e.g., memory circuitry) 12, 22, 32 and interfaces (e.g., interface circuitry) 13, 23, 33. In at least one exemplary embodiment, the control unit 10 is configured to be implemented in and/or used by an IAB donor, e.g., the network node as described above and/or the IAB donor shown in FIGS. 4 to 9, the control unit 20 is configured to be implemented in and/or used by an IAB node 1, e.g., the first one of the plurality of relay nodes shown in FIGS. 4 to 9, and the control unit 30 is configured to be implemented in and/or used by an IAB node 2, e.g., the second one of the plurality of relay nodes shown in FIGS. 4 to 9. Further, each control unit has an own bus system 14, 24, 34 which connects the aforementioned resources such that data can be exchanged between the three components of a unit. In addition, control units 10 and 20, as well as control units 10 and 30 can be connected wirelessly via links 41, 42. Control unit 20 and control unit 30 further have an additional interface 40, which enables a connection between the respective units and their resources.

Figure 1:
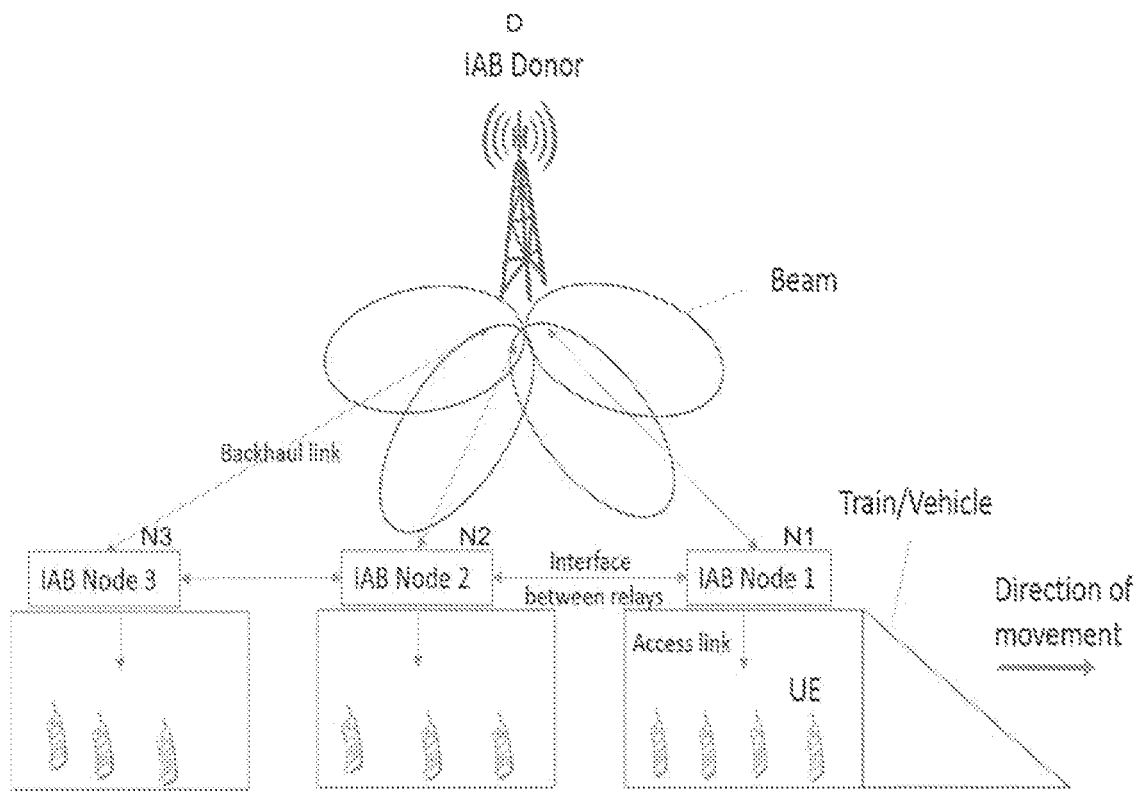
FIG. 1 shows an example of a set of synchronously moving IAB nodes on a high speed train, which are served by an IAB donor.
Figure 2:
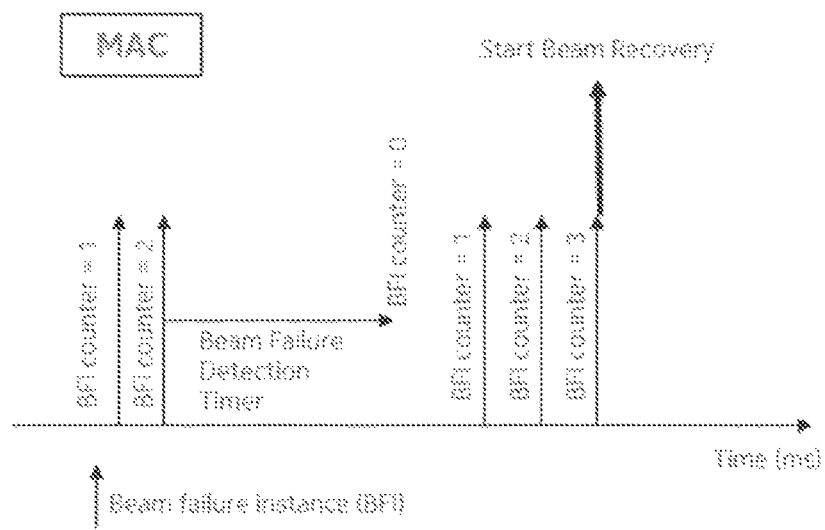
FIG. 2 shows an example of beam failure detection.
Figure 3:
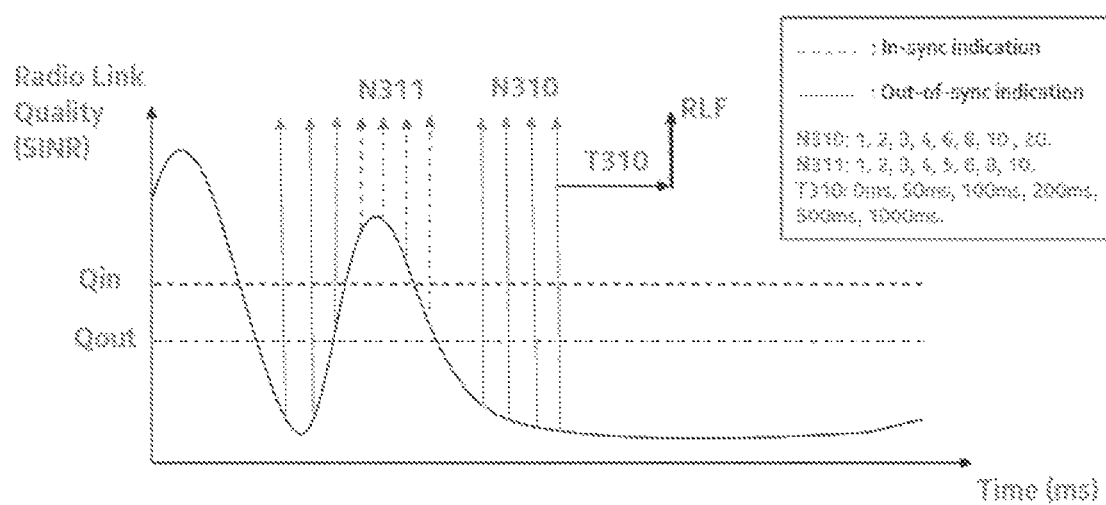
FIG. 3 shows an example of radio link monitoring and radio link failure detection.

As detailed above, in at least some example embodiments, an IAB node 1 (with reference to FIG. 1) that detects beam failure on the backhaul link propagates "beam management assistance information" (e.g., the set of failed serving beams/resource indices (e.g. SSB/CSI-RS), along with the set of SSB/CSI-RS for recovery if it exists), to following IAB(s) 2 (and 3) such that the IAB node 2 can either:

In at least some example embodiments send the beam management assistance information received from the IAB node 1 to the IAB donor which can then decide on the action to be taken for IAB node 2, e.g., switch the set of serving beam(s)/resource indices or extend the current set of serving beams/resource indices to include the recovery candidate SSB/CSI-RS indicated by the former IAB node 1 in the beam management assistance information.

This can happen earlier than the measurements of IAB node 2 would normally indicate, and thus can avoid a failure for IAB node 2.

In at least some other example embodiments a request from the network to switch immediately its set of serving beams/resource indices to new ones that are indicated by the former IAB node 1 or to extend the set of serving beams/resource indices based on the information received from the former IAB node is disclosed.

Upon receiving the beam failure indication from the former IAB 1, IAB node 2 may inform the network node that IAB node 1, identified by an ID, has detected beam failure. Upon receiving this indication, the IAB donor may stop immediately its transmission/reception of user data and control plane to the IAB node 1 and waits until it performs beam failure recovery or RRC re-establishment.

This saves unnecessary radio transmission from the network side.

Furthermore, in at least some example embodiments the IAB donor may receive this information earlier via the proper IAB node 2 connection than it determines internally that IAB 1 has suffered a failure (conventionally, the IAB donor would only find out that the UE has detected beam failure when it identifies the UE performing RACH on the new beam/resource index (e.g. SSB/CSI-RS) during beam failure recovery which may take several tens of ms).

The terms "connected", "coupled", or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The definitions indicated in the present description are based on the current 3GPP standards. However, they are not limiting. Other definitions according to the same or a corresponding concept are applicable to some example embodiments, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments provide, for example, a base station such as a gNB, or a component thereof, an apparatus embodying the same, a method for controlling and/or operating the same, and computer program(s) controlling and/or operating the same as well as mediums carrying such computer program(s) and forming computer program product(s).

In general, the various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless internet access and browsing, as well as portable units or terminals that incorporate combinations of such functions.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus for use by at least a second one of a plurality of relay nodes is provided. For example, the apparatus comprises the control unit 20 or control unit 30 shown in FIG. 11. According to another example implementation or in addition, the apparatus is configured to execute the method 1 illustrated in FIG. 4.

According to an aspect, the apparatus comprises means for establishing a communication link between a first one of a plurality of relay nodes and at least a second one of the plurality of relay nodes, which are in synchronous movement, means for receiving beam management assistance information from the first one of the plurality of relay nodes at the at least second one of the plurality of relay nodes upon an occurrence of beam failure at the first one of the plurality of relay nodes, means for deciding, at the at least second one of the plurality of relay nodes, about a timing at which the received beam management assistance information is to be transmitted to a serving network node, and means for transmitting the received beam management assistance information from the at least second one of the plurality of relay nodes to the serving network node at the decided timing.

According to an example implementation, the apparatus further comprises means for receiving a command from the serving network node at the at least second one of the plurality of relay nodes to change a current set of serving resource indices to a new set of resource indices determined by the serving network node, and means for applying the received new set of resource indices at the at least second one of the plurality of relay nodes, and means for exchanging data between the at least second one of the plurality of relay nodes and the serving network node using the new set of resource indices.

According to an example implementation, the means for deciding, at the at least second one of the plurality of relay nodes, about the timing at which the received beam management assistance information is to be transmitted to the serving network node further is adapted to send the received beam management assistance information immediately upon receipt of the beam management assistance information, or is adapted to set the time to send the received beam management assistance information to be before a certain time instant T.

According to an example implementation, the means for receiving of beam management assistance information from the first one of the plurality of relay nodes at the at least second one of the plurality of relay nodes further is adapted to receive a beam failure report from the first one of the plurality of relay nodes, and the means for transmission of the received beam management assistance information further is adapted to transmit an indication about beam failure detection by the first one of the plurality of relay nodes to the serving network node.

According to an example implementation, the transmission of the indication about beam failure detection is performed in combination with the transmission of the received beam management assistance information to the serving network node at the decided timing or is performed independently thereof.

According to at least some example embodiments, an apparatus for use by a serving network node which provides a communication service to a plurality of relay nodes is provided. For example, the apparatus comprises the control unit 10 shown in FIG. 11. According to another example implementation or in addition, the apparatus is configured to execute the method 2 illustrated in FIG. 5.

According to an aspect, the apparatus comprises means for providing a communication service from a serving network node to a first one of a plurality of relay nodes, which are in synchronous movement and configured to communicate with each other, means for receiving beam management assistance information from a second one of the plurality of relay nodes, and means for determining a new set of resource indices.

According to an example implementation, the apparatus further comprises means for transmitting a command to the second one of the plurality of relay nodes to change a current set of resource indices to the new set of resource indices, and means for exchanging data using the new set of resource indices with the second one of the plurality of relay nodes.

In an example implementation, the beam management assistance information comprises at least one of a set of current resource indices, a set of potential new resource indices, a timestamp at which beam failure was detected at the first one of the plurality of relay nodes, and identification information of the serving network node.

In an example implementation, the serving network node considers the beam management assistance information if the second one of the plurality of relay nodes is served on the same set of resource indices as the first of the plurality of relay nodes.

In an example implementation, the beam management assistance information comprises an indication about the possibility of declaring beam failure on the set of current resource indices and a set of potential new resource indices.

In an example implementation, the set of potential new candidates of resource indices is the same as the set of potential new resource indices, received from the first one of the plurality of relay nodes.

In an example implementation, the determined new set of resource indices comprises at least one resource index from the set of potential new resource indices, and/or the determined new set of resource indices comprises the current set of resource indices and at least one resource index from the set of potential new resource indices.

According to at least some other example embodiments, an apparatus for use by at least a second one of a plurality of relay nodes is provided. For example, the apparatus comprises the control unit 20 or control unit 30 shown in FIG. 11. According to another example implementation or in addition, the apparatus is configured to execute the method 3 illustrated in FIG. 6.

According to an aspect, the apparatus comprises means for establishing a communication link between a first one of a plurality of relay nodes and at least a second one of the plurality of relay nodes, which are in synchronous movement, means for receiving beam management assistance information from the first one of the plurality of relay nodes at the at least second one of the plurality of relay nodes upon an occurrence of beam failure at the first one of the plurality of relay nodes, means for determining a new set of resource indices at the at least second one of the plurality of relay nodes, means for deciding, at the at least second one of the plurality of relay nodes, about a timing at which a request to change a current set of resource indices to the determined new set of resource indices is to be transmitted to a serving network node, and means for transmitting the request to change the current set of resource indices to the determined new set of resource indices from the at least second one of the plurality of relay nodes to the serving network node at the decided timing.

According to an example implementation, the apparatus further comprises means for receiving an acknowledgement for the transmitted request at the at least second one of the plurality of relay nodes from the serving network node, and means for exchanging data between the at least second one of the plurality of relay nodes and the serving network nodes using the determined new set of resource indices.

In an example implementation, the beam management assistance information comprises at least one of a set of current resource indices, a set of potential new resource indices, a timestamp at which beam failure was detected at the first one of the plurality of relay nodes, and identification information of the serving network node.

According to an example implementation, the means for deciding, at the at least second one of the plurality of relay nodes, about the timing at which the request to change the current set of resource indices to the determined new set of resource indices is to be transmitted to the serving network node further is adapted to send the new set of resource indices immediately upon determining the new set of resource indices, or is adapted to set the time to send the new set of resource indices to be before a certain time instant T.

In an example implementation, the certain time instant T is determined by adding an offset to the time instant of receiving the beam management assistance information from the first one of the plurality of relay nodes, wherein the offset is determined by determining the time needed for the beam management assistance information to travel from the first one of the plurality of relay nodes to the at least second one of the plurality of relay nodes.

In an example implementation, the beam management assistance information comprises an indication about the possibility of declaring beam failure on the set of current resource indices and a set of potential new candidates of resource indices.

In an example implementation, the set of potential new candidates of resource indices is the same as the set of potential new resource indices, received from the first one of the plurality of relay nodes.

According to an example implementation the means for receiving of beam management assistance information from the first one of the plurality of relay nodes at the at least second one of the plurality of relay nodes further is adapted to receive a beam failure report from the first one of the plurality of relay nodes, and the means for transmission of the request to change the current set of resource indices to the determined new set of resource indices further is adapted to transmit an indication about beam failure detection by the first one of the plurality of relay nodes to the serving network node.

In an example implementation, the beam failure report comprises identification information about the first one of the plurality of relay nodes, at which the beam failure occurred.

In an example implementation, the transmission of the indication about beam failure detection is performed in combination with the transmission of the request to change the current set of resource indices to the determined new set of resource indices from the at least second one of the plurality of relay nodes to the serving network node at the decided timing or is performed independently thereof.

According to at least some other example embodiments, an apparatus for use by a serving network node which provides a communication service to a plurality of relay nodes is provided. For example, the apparatus comprises the control unit 10 shown in FIG. 11. According to another example implementation or in addition, the apparatus is configured to execute the method 4 illustrated in FIG. 7.

According to an aspect, the apparatus comprises means for providing a communication service from a serving network node to a first one of a plurality of relay nodes, which are in synchronous movement and configured to communicate with each other, means for receiving a request from the second one of the plurality of relay nodes to change a current set of resource indices to a new set of resource indices determined by a second one of the plurality of relay nodes, and means for applying the requested set of determined new resource indices.

According to an example implementation, the apparatus further comprises means for transmitting an acknowledgement for the transmitted request to the second one of the plurality of relay nodes, and means for exchanging data using the new set of resource indices with the second one of the plurality of relay nodes.

According to an example implementation, the apparatus further comprises means for receiving an indication about beam failure detection by the first one of the plurality of relay nodes from the second one of the plurality of relay nodes, and means for stopping transmission and/or reception towards the first one of the plurality of relay nodes.

In an example implementation, the first one of the plurality of relay nodes is an Integrated Access and Backhaul IAB node moving in front of the second one of the plurality of relay nodes, the second one of the plurality of relay nodes is a subsequent Integrated Access and Backhaul IAB node, the serving network node is an Integrated Access and Backhaul IAB donor, and the resource index is Synchronization Signal Block/Channel State Information-Reference Signal SSB/CSI-RS.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus comprising at least one processor and at least one memory including computer program code, the at least one memory and the computer program code configured to, with the at least one processor, cause the apparatus at least to perform:
    establishing a communication link between a first one of a plurality of relay nodes and at least a second one of the plurality of relay nodes, which are in synchronous movement,
    receiving beam management assistance information from the first one of the plurality of relay nodes at the at least second one of the plurality of relay nodes upon an occurrence of beam failure at the first one of the plurality of relay nodes,
    deciding, at the at least second one of the plurality of relay nodes, about a timing at which the received beam management assistance information is to be transmitted to a serving network node, and
    transmitting the received beam management assistance information from the at least second one of the plurality of relay nodes to the serving network node at the decided timing.

2. The apparatus according to claim 1, wherein the at least one memory and the computer program code are configured to, with the at least one processor, cause the apparatus to further perform:
    receiving a command from the serving network node at the at least second one of the plurality of relay nodes to change a current set of serving resource indices to a new set of resource indices determined by the serving network node,
    applying the received new set of resource indices at the at least second one of the plurality of relay nodes, and
    exchanging data between the at least second one of the plurality of relay nodes and the serving network node using the new set of resource indices.

3. The apparatus according to claim 1, wherein the deciding, at the at least second one of the plurality of relay nodes, about the timing at which the received beam management assistance information is to be transmitted to the serving network node comprises
    sending the received beam management assistance information immediately upon receipt of the beam management assistance information, or
    setting the time to send the received beam management assistance information to be before a certain time instant T.

4. The apparatus according to claim 1, wherein
    the receiving of beam management assistance information from the first one of the plurality of relay nodes at the at least second one of the plurality of relay nodes further comprises
    receiving a beam failure report from the first one of the plurality of relay nodes, and
    wherein the transmission of the received beam management assistance information further comprises
    transmitting an indication about beam failure detection by the first one of the plurality of relay nodes to the serving network node.

5. The apparatus according to claim 4, wherein the transmission of the indication about beam failure detection is performed in combination with the transmission of the received beam management assistance information to the serving network node at the decided timing or is performed independently thereof.

6. An apparatus comprising at least one processor and at least one memory including computer program code, the at least one memory and the computer program code configured to, with the at least one processor, cause the apparatus at least to perform:
   providing a communication service from a serving network node to a first one of a plurality of relay nodes, which are in synchronous movement and configured to communicate with each other,
   receiving beam management assistance information from a second one of the plurality of relay nodes, and
   determining a new set of resource indices.

7. The apparatus according to claim 6, wherein the at least one memory and the computer program code are configured to, with the at least one processor, cause the apparatus to further perform:
   transmitting a command to the second one of the plurality of relay nodes to change a current set of resource indices to the new set of resource indices, and
   exchanging data using the new set of resource indices with the second one of the plurality of relay nodes.

8. The apparatus according to claim 6, wherein the beam management assistance information comprises at least one of a set of current resource indices, a set of potential new resource indices, a timestamp at which beam failure was detected at the first one of the plurality of relay nodes, and identification information of the serving network node.

9. The apparatus according to claim 6, wherein the serving network node considers the beam management assistance information if the second one of the plurality of relay nodes is served on the same set of resource indices as the first of the plurality of relay nodes.

10. The apparatus according to claim 6, wherein the beam management assistance information comprises an indication about the possibility of declaring beam failure on the set of current resource indices and a set of potential new resource indices.

11. The apparatus according to claim 10, wherein the set of potential new candidates of resource indices is the same as the set of potential new resource indices, received from the first one of the plurality of relay nodes.

12. An apparatus comprising at least one processor and at least one memory including computer program code, the at least one memory and the computer program code configured to, with the at least one processor, cause the apparatus at least to perform:
   establishing a communication link between a first one of a plurality of relay nodes and at least a second one of the plurality of relay nodes, which are in synchronous movement,
   receiving beam management assistance information from the first one of the plurality of relay nodes at the at least second one of the plurality of relay nodes upon an occurrence of beam failure at the first one of the plurality of relay nodes,
   determining a new set of resource indices at the at least second one of the plurality of relay nodes,
   deciding, at the at least second one of the plurality of relay nodes, about a timing at which a request to change a current set of resource indices to the determined new set of resource indices is to be transmitted to a serving network node, and
   transmitting the request to change the current set of resource indices to the determined new set of resource indices from the at least second one of the plurality of relay nodes to the serving network node at the decided timing.

13. The apparatus according to claim 12, wherein the at least one memory and the computer program code are configured to, with the at least one processor, cause the apparatus to further perform:
   receiving an acknowledgement for the transmitted request at the at least second one of the plurality of relay nodes from the serving network node, and
   exchanging data between the at least second one of the plurality of relay nodes and the serving network nodes using the determined new set of resource indices.

14. The apparatus according to claim 12, wherein the beam management assistance information comprises at least one of a set of current resource indices, a set of potential new resource indices, a timestamp at which beam failure was detected at the first one of the plurality of relay nodes, and identification information of the serving network node.

15. The apparatus according to claim 12, wherein the deciding, at the at least second one of the plurality of relay nodes, about the timing at which the request to change the current set of resource indices to the determined new set of resource indices is to be transmitted to the serving network node comprises
   sending the new set of resource indices immediately upon determining the new set of resource indices, or
   setting the time to send the new set of resource indices to be before a certain time instant T.

16. The apparatus according to claim 15, wherein the certain time instant T is determined by adding an offset to the time instant of receiving the beam management assistance information from the first one of the plurality of relay nodes, wherein the offset is determined by determining the time needed for the beam management assistance information to travel from the first one of the plurality of relay nodes to the at least second one of the plurality of relay nodes.

17. The apparatus according to claim 12, wherein the beam management assistance information comprises an indication about the possibility of declaring beam failure on the set of current resource indices and a set of potential new candidates of resource indices, and wherein the set of potential new candidates of resource indices is the same as the set of potential new resource indices, received from the first one of the plurality of relay nodes.

18. The apparatus according to claim 12, wherein the receiving of beam management assistance information from the first one of the plurality of relay nodes at the at least second one of the plurality of relay nodes further comprises
   receiving a beam failure report from the first one of the plurality of relay nodes, and
   wherein the transmission of the request to change the current set of resource indices to the determined new set of resource indices further comprises
   transmitting an indication about beam failure detection by the first one of the plurality of relay nodes to the serving network node.

19. The apparatus according to claim 18, wherein the beam failure report comprises identification information about the first one of the plurality of relay nodes, at which the beam failure occurred, wherein the transmission of the indication about beam failure detection is performed in combination with the transmission of the request to change the current set of resource indices to the determined new set of resource indices from the at least second one of the plurality of relay nodes to the serving network node at the decided timing or is performed independently thereof.

20. A method, comprising
establishing a communication link between a first one of a plurality of relay nodes and at least a second one of the plurality of relay nodes, which are in synchronous movement,
receiving beam management assistance information from the first one of the plurality of relay nodes at the at least second one of the plurality of relay nodes upon an occurrence of beam failure at the first one of the plurality of relay nodes,
deciding, at the at least second one of the plurality of relay nodes, about a timing at which the received beam management assistance information is to be transmitted to a serving network node, and
transmitting the received beam management assistance information from the at least second one of the plurality of relay nodes to the serving network node at the decided timing.

* * * * *